United States Patent [19]
Barrus

[11] 3,965,757
[45] June 29, 1976

[54] SCRAM RELEASE FOR A CONTROL ROD

[75] Inventor: Donald Martin Barrus, Enfield, Conn.

[73] Assignee: Combustion Engineering, Inc., Windsor, Conn.

[22] Filed: Dec. 12, 1973

[21] Appl. No.: 424,125

[52] U.S. Cl. .................................. 74/30; 74/422; 176/36 R
[51] Int. Cl.² ........................................ F16H 19/04
[58] Field of Search ................ 74/29, 30, 422, 425; 176/36 R

[56] References Cited
UNITED STATES PATENTS

| | | | |
|---|---|---|---|
| 195,638 | 9/1877 | Nichols | 74/437 |
| 3,356,874 | 12/1967 | Chiapparelli et al. | 74/424.8 R |
| 3,405,032 | 10/1968 | Barrus et al. | 74/422 |
| 3,494,827 | 2/1970 | Zinn | 74/422 |
| 3,572,161 | 3/1971 | Lichtenberger et al. | 176/36 R |
| 3,778,345 | 12/1973 | Maslenok et al. | 176/36 R |

Primary Examiner—Samuel Scott
Assistant Examiner—Wesley S. Ratliff, Jr.
Attorney, Agent, or Firm—Stephen L. Borst

[57] ABSTRACT

A double-sided rack and pinion control element drive mechanism for a nuclear reactor is disclosed wherein scram release is accomplished by the dual action of withdrawing the pinion from its engagement with the rack while at the same time rotating the pinion in a direction consistent with the movement of the rack and the control rod in their downward travel. The pinion is withdrawn from engagement with the rack while remaining in engagement with its stationary driving means. The continuing engagement with the stationary driving means causes the pinion to rotate when the pinion is caused to move away from the rack during disengagement.

10 Claims, 7 Drawing Figures

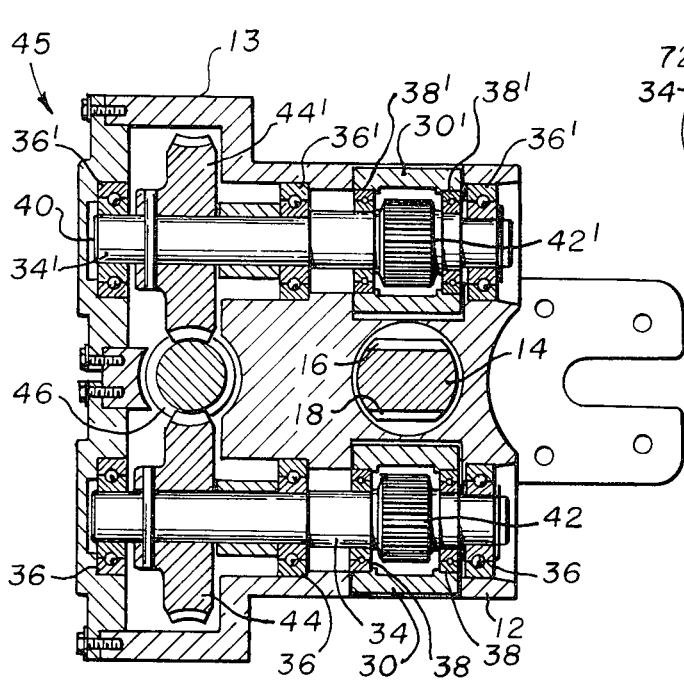

SCRAM RELEASE FOR A CONTROL ROD

This invention relates to the art of linear drive apparatus and more specifically it relates to the scram release of a control rod of a nuclear reactor.

Many attempts have been made heretofore to provide rack and pinion control rod linear drives for nuclear reactors whereby the control rod drive mechanism is capable of withdrawing the control rod from and inserting the control rod into the reactor core in a controlled manner, while also being capable of rapid disengagement which allows the control rod to fall or to be thrust into the core in emergency situations. Rack and pinion control rod drive mechanisms heretofore proposed, generally, have suffered from the difficulty that emergency disengagement of the driving means resulted in excessive strains and wear and tear on one or more elements of the driving linkage. This necessitated frequent, costly and bothersome repairs. Use of a clutch for engagement and disengagement of a control rod drive mechanism of the rack and pinion type is well known. The practice involves the utilization of the clutch intermediate the driving motor and the pinion which engages the control rod rack, but incorporates the disadvantages of clutch wear and tear resulting in eventual control rod slippage which is unacceptable in the control of the nuclear reactor. A further disadvantage is that when an emergency control rod release is required, the control rod scram is delayed by the inertia and additional friction of the spinning parts, including the pinion which remains in engagement with the rack and the clutch face which is connected to the pinion. An even more serious disadvantage is that the pinion, the clutch or any of the linkage which connects the pinion to the clutch may become inadvertently bound, thereby preventing the successful emergency insertion of the control rod into the reactor core since the bound part remains connected to the control rod.

In the present invention these disadvantages are alleviated by providing disengagement of the pinion from the control rod rack in a manner which minimizes wear and structural fatigue, while at the same time allows the control rod to move into the core entirely free from external interference.

SUMMARY OF THE INVENTION

These and other objects are accomplished by providing a movable pinion which can be withdrawn from the rack for its disengagement from the rack. The essential feature of the present invention contemplates the withdrawal of the pinion from the rack in such a manner that the pinion is caused to rotate during its withdrawal from the rack in a direction consistent with control rod insertion into the core. The pinion is mounted on a movable support member which, during driving operations, holds the pinion in engagement with both the control rod rack and a toothed driving means. The toothed driving means, e.g. a spur gear, is caused to rotate to impart driving motion to the pinion but is otherwise held in a fixed position so that it is not allowed to move relative to the control rod rack. When control rod scram is required, the movable support member moves the pinion away from the rack in such a manner that the pinion engagement with the toothed driving means is maintained. As a result of this continuing engagement with the toothed driving means the pinion is caused to rotate as it moves away from the control rod rack.

DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 3 is a section of FIG. 1 taken along line 3—3;

FIG. 5 is a section of FIG. 1 taken along line 5—5;

FIG. 6 depicts the detail of a second embodiment of a control rod drive mechanism wherein the pinion is driven by a worm.

FIG. 7 depicts the detail of a third embodiment of a control rod drive mechanism wherein the pinion is driven by a chain drive.

DESCRIPTION OF THE PREFERRED EMBODIMENT

While the preferred embodiment will be described in terms of a nuclear reactor control rod drive mechanism, it should be understood that the instant invention has equal applicability to any linear drive apparatus and especially to those linear drive mechanisms which are loaded or biased with a force to move in a preferred direction. This biasing or loading force may be provided by a spring, or a source of pressurized gas, or, as in the case of a nuclear reactor control rod mechanism, by gravity. In some nuclear applications the biasing force or the load force is provided by a combination of a plurality of the above-mentioned loading forces.

Figure 1:
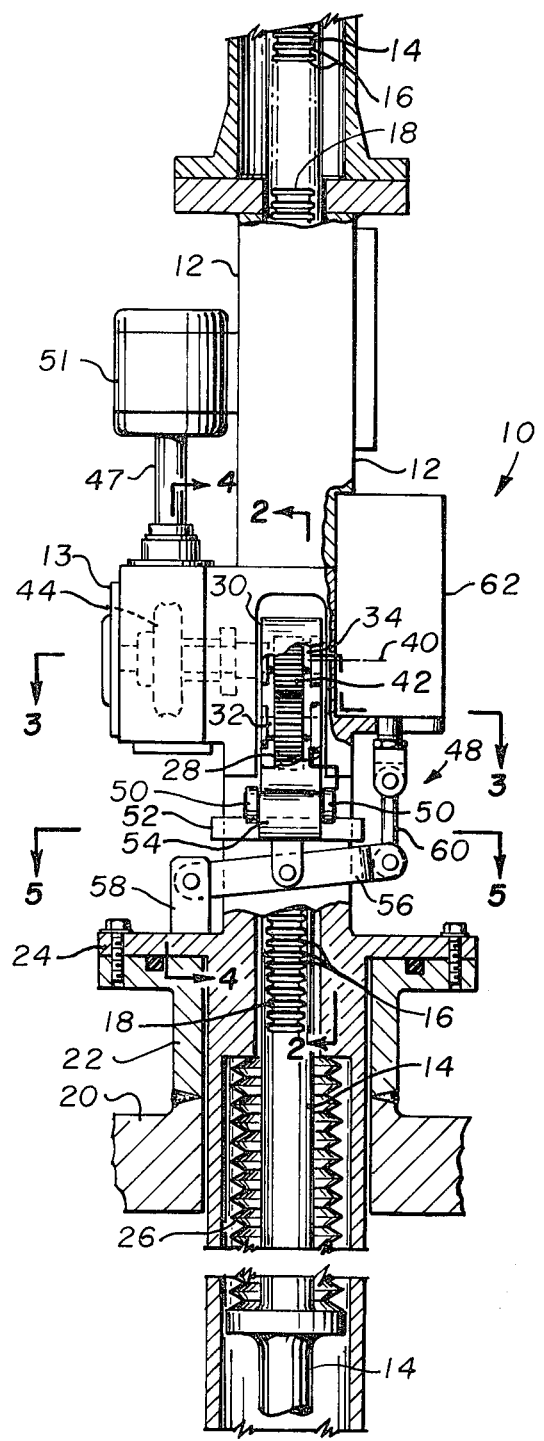
FIG. 1 depicts a portion of the control rod drive mechanism utilizing a rack and pinion drive.

FIG. 1 represents a portion of the invention which is a scram release mechanism for a nuclear reactor control rod drive mechanism generally indicated by 10. The drive mechanism 10 has a housing 12 with a flange 24 which is connected to the reactor pressure vessel head 20 by means of a nozzle 22. On the interior of the housing 12 is a longitudinally extended linearly movable element, the control rod 14, the uppermost portion of which is formed with spaced teeth 16 on opposing sides thereof to form a double sided rack 18, hereafter referred to as the control rod rack. The control rod 14 extends down through the nozzle 22 and through the reactor pressure vessel head 20 through a head penetration into the interior of the reactor pressure vessel and into the reactor core (not shown). The control rod rack 18 is sealed from the internal atmosphere of the reactor by bellows 26 which is attached to the lower portion of the control rod rack and to the housing 12. A possible alternative arrangement would be to attach the bellows to the reactor head nozzle 22.

Figure 2:
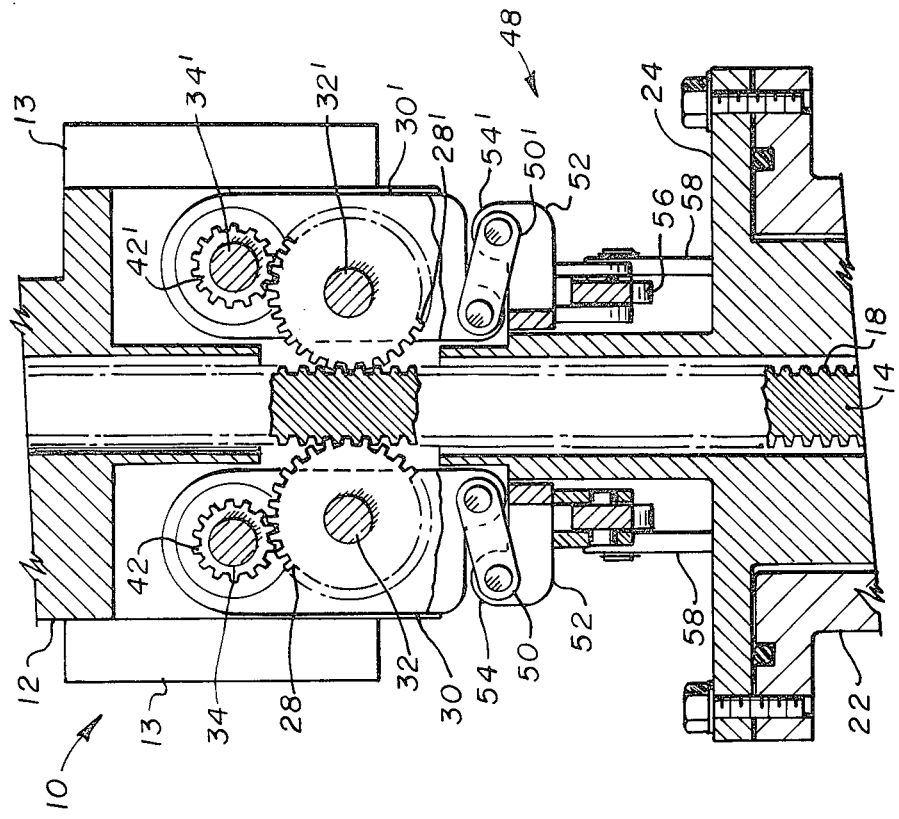
FIG. 2 is a section of FIG. 1 taken along line 2—2.

The control rod drive mechanism 10 of the present invention consists of a double-sided drive designed to maximize drive with a minimum of friction. It will be recognized by those skilled in the art that unnecessary friction represents an unnecessary danger as it not only slows down the reaction time of the drive mechanism but also increases the possibility of binding or jamming. As seen in FIG. 2 the preferred embodiment of the scramming control rod drive consists of a pair of opposed gears adapted to engage opposite sides of the double-sided rack hereafter called the pinions 28. As the two sides are identical in their structure, only one side will be described in detail. When it is appropriate to refer to the identical reflected side, the corresponding elements will be designated by primed numbers corresponding to their unprimed counterparts. The pinion 28 is rotatably mounted on a support member 30 which is movably suspended from the housing 12. Support member 30 consists of a box like element with one side missing; i.e., the side facing the control rod rack 18. With this configuration, the pinion 28 is supported on a shaft 32 which is mounted in the two sides of the box-like support member 30 while at the same time being able to penetrate through the open side of the box to engage the control rod rack 18. For purposes of clarity of description, this support member 30 will be described as having first and second ends, the support member being rotatably suspended at its first end from the housing 12 and rotatably carrying the pinion 28 at its second end. The rotational support of the support member 30 as seen in FIG. 3 comprises a shaft 34 which is rotatably fixed in the housing 12 by bearings 36. The support member 30 is rotatably positioned on this shaft 34 by bearings 38 so that the axis of the shaft 34 defines an axis of rotation 40 about which the support member 30 may rotate. The shaft 34 is laterally spaced from the control rod rack 18 by an amount greater than the radius of the pinion 28 so that during disengagement of the pinion 28 from the rack 18, the pinion 28 moves down and away from the control rod rack thereby minimizing the possibility of jamming.

For the practice of the instant invention, it is preferable to drive the pinion 28 by a means having a plurality of spaced alternating depressions and protrusions adapted to engage the pinion gear. This is preferable since the scram release mechanism of the control rod drive is designed so that at least a portion of support member 30 may be moved relative to the driving means and if the driving means is a "toothed" means this relative movement causes the pinion, which remains in engagement with the driving means, to rotate during its disengagement from the rack. It is a feature of the three embodiments of the present invention disclosed herein that the pinion is caused to rotate during its disengagement from the control rod rack in a direction consistent with the direction of insertion of the control rod into the reactor core. As a consequence, as the control rod is scrammed into the core, the engaging pinion rolls away rather than slides away, thereby greatly minimizing the concentrated stresses and frictions as breakaway is approached.

In the preferred embodiment the toothed driving means is a spur gear 42 which is positioned inside the box like support member 30 and is attached to the driving shaft 34. In other embodiments, illustrated in FIGS. 6 and 7 and to be described later, the toothed driving means comprises a worm 64 and a chain linkage 66 respectively. As can be seen in FIG. 2, the driving spur gear 42 remains in engagement with the pinion gear 28 even when the support member 30 is rotated around the axis 40 of shaft 34 during a scram release thereby causing the pinion 28 to disengage from the control rod rack 14.

Figure 4:
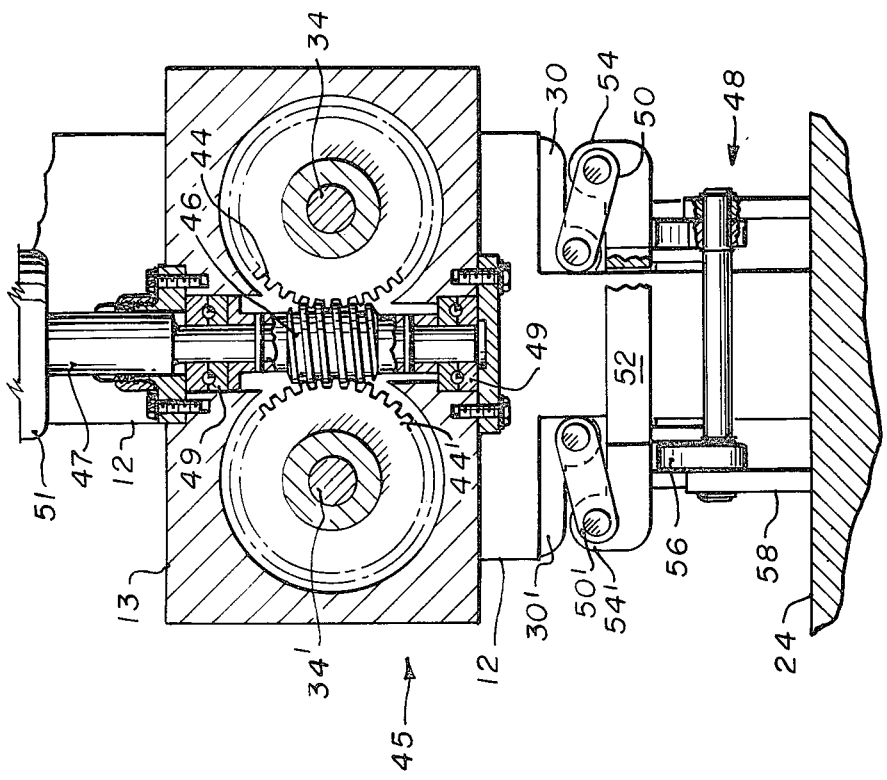
FIG. 4 is a section of FIG. 1 taken along line 4—4.

The driving spur gear 42 is attached to the shaft 34 which acts as a drive shaft. The shaft 34 obtains its drive from the gear 44 attached to the shaft 34 at the end opposite from the driving spur gear 42 (see FIG. 3). Worm gear 44 is caused to rotate by worm 46. As can be seen in FIG. 4, the worm 46 simultaneously drives the two intermediate worm gears 44 and 44' to split the drive into two separate drive linkages which deliver the drive to both sides of the control rod rack 18. Worm 46 is driven by shaft 47 which is in turn driven by drive motor 51. In this manner the two pinions are driven in opposite senses so that their net effect in driving the double-sided control rod rack 18 is a concurrent drive that urges the rack in one direction. Parts of the above described drive train is common to the three disclosed embodiments and is generally indicated by the numeral 45. The shaft 47 is mounted in bearings 49. Bearings 49, worm 46 and drive gears 44 and 44' are all contained within a gear housing 13 which is an adjunct part of the housing 12.

Returning now to support member 30, the linkage connected to support member 30 for moving the support member will be described. This linkage, indicated generally by 48, is devised to perform the dual purposes of (1) holding the pinions 28 in engagement with the control rod rack 18 when the control rod 14 is being driven into or out of the core or when the control rod is being held stationary; and (2) simultaneously pulling the pinions 28 and 28' away from the control rod rack 18 to release the control rod 14 for rapid scram. Referring now to FIGS. 1 and 2, toggle links 50 and 50' are pivotally connected respectively to support members 30 and 30' at their second ends. The links 50 and 50' are also pivotally connected to fastening lugs 54 and 54' of square collar 52. The square collar 52 as seen in FIG. 5, is slidably disposed around the control rod rack 18 and the housing 12. The collar 52 carries a pair of fastening lugs 54 and 54' disposed on opposite sides of the collar 52 adjacent to but laterally displaced from the teeth 16 of the double-sided control rod rack 18. From the arrangement in FIG. 2, it can be seen that when collar 52 is moved away from the support members 30 and 30', the toggle linkage 50 and 50' tend to pull the support members 30 and 30' away from the control rod rack 18 thereby disengaging the pinions 28 and 28' which are carried by the support members 30 and 30' from the control rod rack 18. Since the support members 30 and 30' are pivoted around the axis of the driving gears 42 and 42', the pinion gears are caused to rotate as they are disengaged from the rack. Thus, means for concurrently rotating and disengaging the pinion gears from the racks has been described. Returning now to a completion of the description of the disengaging linkage 48, the collar 52 is centrally pivotally connected to a yoke 56. The yoke 56 is in turn pivotally connected to housing stanchions 58 at its open ends and is pivotally connected to a linear actuator extension or stem 60 at its single end. In the preferred embodiment, the linear actuator is a solenoid 62 (seen in FIG. 1) which is mounted on the housing 12. The linkage 48 is such that when the solenoid is energized, the actuator extension or stem 60 is held in an up position thereby drawing the yoke 56 and the collar 52 into their uppermost positions. This causes the toggle links 50 and 50' to hold the support members 30 and 30' and thus the pinions 28 and 28' in their rack engaging position. When the solenoid 62 is deenergized, the pinions 28 and 28' are no longer actively held against the control rod rack 18. In this situation the weight of the control rod rack 18 causes the pinions 28 and 28' to rotate in their rod inserting directions. This rotation causes the pinions to roll out and away from the control rod rack due to their continuing engagement with the driving gears 42 and 42'. In this manner the pinions and the support members are pushed away from the rack until disengagement is complete. Upon the completion of disengagement, the control rod 14 and the associated control rod rack 18 is free to fall into the reactor core without interference from the driving mechanism. If for some reason the control rod should jam, the drive mechanism can be reengaged with the control rod rack 18 so that the drive mechanism can be used to actively drive the control rod into the core. It will also be recognized by those skilled in the art that it is possible by this arrangement to give an initial impulse to the control rod during scram. This would be accomplished by actively actuating the disengaging mechanism rather than simply allowing the pinion gears to be pushed aside by the weight of the control rod. If the actuating stem 60 or the yoke 56 were actively driven down, the resultant effect of pulling the engaging pinions 28 and 28' away from the control rod rack 18 would be a downwardly driving force exerted by the pinions on the racks as the pinions are rotated while being disengaged from the racks.

Two additional embodiments are illustrated in FIGS. 6 and 7. As these embodiments may utilize the same split driving train 45 and the same disengaging linkage 48 as those already described in the above preferred embodiment their description will not be repeated. The embodiment illustrated in FIG. 6 discloses a modification to the preferred embodiment which incorporates a double pitched worm 64 with right and left hand threads as the driving means. The worm 64 is mounted on the housing 12 by suitable bearings 68. Fastened to each end of the worm shaft 64 are beveled gears 70 and 70'. These beveled gears 70 and 70' mesh with a second pair of beveled gears 72 and 72' which are attached to the drive shafts 34 and 34' of the split drive train 45 as described above. The left and right hand threads of the worm 64 mesh with a pair of worm or pinion gears 28 and 28' respectively which are positioned above the worm 64. The worm gears 28 and 28' are also adapted to engage the control rod rack 18. The pinion gears are rotatably supported by a pair of support members 31 and 31' respectively by worm gear shaft 32 and 32'. These support members each have first and second ends and are respectively rotatably supported from the housing 12 at their first ends by shafts 35 and 35'. In a manner similar to that disclosed in the above-described preferred embodiment, the points of support are spaced away from the rack by a distance greater than the radius of the pinion in order to minimize the possibility of jamming the rack and the pinion. The second ends of the support members 31 and 31' are connected to a disengaging linkage 48 identical with the disengaging linkage described above in the preferred embodiment.

In a third embodiment, illustrated in FIG. 7, is disclosed a control rod drive mechanism which incorporates a chain drive arrangement. Once again the split drive train 45 and the disengagement linkage 48 are the same as described in the preferred embodiment so their description will not be repeated. In this embodiment the pinion is actually a pinion cluster 29 with the associated cluster gear 33 being a chain sprocket. The pinion cluster gear is supported by support member 30 in a fashion identical to that described in the preferred embodiment. The preferred embodiment is modified, however, in that the driving gear is not a spur gear in direct engagement with the pinion gear but is a sprocket wheel 41 displaced from the pinion cluster.

The sprocket wheel 41 is mounted on drive shaft 34 and is operatively connected to the pinion cluster 29 and the pinion cluster sprocket 33 by driving chain 66. In a manner similar to that of the preferred embodiment, the support member 30 is pivotally suspended at its first end about the drive shaft 34 and rotates about the axis 40. Thus, when the disengaging linkage 48 is activated to move the support member 30, the pinion cluster 29 is disengaged from the control rod rack 18 and is imparted a rotational motion due to its continuing operative engagement with the chain 66 and the sprocket wheel 41.

What is claimed is:

1. A linear drive apparatus, comprising:
   a. a housing;
   b. a longitudinally extended linearly movable toothed element disposed in said housing;
   c. a gear adapted to engage said toothed element;
   d. means mounted on said housing for driving said gear, said means including a chain and a chain sprocket;
   e. means for concurrently rotating and disengaging said gear from said linearly movable element by moving said gear away from said linearly movable element.

2. A linear drive apparatus, comprising:
   a. a housing;
   b. a longitudinally extended linearly movable toothed element disposed in said housing;
   c. a gear adapted to engage said toothed element;
   d. means mounted on said housing for driving said gear, said means having a plurality of spaced alternating depressions and protrusions adapted to engage said gear for driving said gear; and
   e. means for concurrently rotating and disengaging said gear from said lineraly movable element by moving said gear away from said linearly movable element including a support member movably suspended from said housing for carrying said gear adapted to engage said toothed element wherein said support member continuously holds said gear in engagement with said driving means during the movement of said support member, and means supported from said housing and connected to said support member for moving said support member for disengagement of said gear from said toothed element.

3. A linear drive apparatus, comprising:
   a. a housing;
   b. a longitudinally extended linearly movable element disposed in said housing, said element having a plurality of spaced teeth thereon and said element being loaded to move in a preferred direction parallel to its longitudinal axis;
   c. a support member movably suspended from said housing;
   d. a gear rotatably mounted on said support member, the teeth of said gear being adapted to mesh with said spaced teeth on said linearly movable element;
   e. means mounted on said housing for driving said gear, said driving means adapted to engage said gear; and
   f. means mounted on said housing and connected to said support member for moving said support member relative to said driving means causing said gear to rotate in a direction which urges said linearly movable element in said preferred direction as said gear disengages from said spaced teeth on said linearly movable element.

4. A linear drive apparatus, comprising:
 a. a housing;
 b. a longitudinally extended linearly movable element disposed in said housing, said element having a plurality of spaced teeth thereon and said element being loaded to move in a preferred direction parallel to its longitudinal axis;
 c. a driving shaft rotatably supported by said housing, the center of said driving shaft defining an axis of rotation;
 d. means for driving said driving shaft;
 e. a driving gear affixed to said driving shaft;
 f. a support member having first and seconds ends, said support member being rotatably mounted at said first end for rotation about said axis of said driving shaft and said second end being spaced relative to said driving shaft in said preferred direction;
 g. a pinion gear rotatably mounted on said second end of said support member and engaging said driving gear, said pinion gear adapted to mesh with said spaced teeth on said linearly movable element; and
 h. means connected to said support member for moving said second end of said support member relative to said driving gear for engaging and disengaging said pinion gear from said teeth on said linearly movable element while said pinion gear remains in engagement with said driving gear.

5. A linear drive apparatus, comprising:
 a. a housing;
 b. a longitudinally extended linearly movable element disposed in said housing, said element having a plurality of spaced teeth thereon and said element being loaded to move in a preferred direction parallel to its longitudinal axis;
 c. a driving shaft rotatably supported by said housing;
 d. means for driving said driving shaft;
 e. a worm coaxially affixed on said driving shaft;
 f. a support member movably supported by said housing;
 g. a worm gear rotatably mounted on said movable support member in engagement with said worm and spaced relative to said driving shaft in said preferred direction, said worm gear adapted to mesh with said spaced teeth on said linearly movable element;
 h. means connected to said movable support member for moving said support member relative to said driving shaft and to said worm for engaging and disengaging said worm gear from said teeth on said linearly movable element while said worm gear remains in engagement with said worm.

6. A linear drive apparatus, comprising:
 a. a housing;
 b. a longitudinally extended linearly movable element disposed in said housing, said element having a plurality of spaced teeth thereon and said element being loaded to move in a preferred direction parallel to its longitudinal axis;
 c. a support member movably suspended from said housing;
 d. a gear rotatably mounted on said support member, the teeth of said gear being adapted to mesh with said spaced teeth on said linearly movable element;
 e. means mounted on said housing for driving said gear, said driving means adapted to engage said gear;
 f. means mounted on said housing and connected to said support member for moving said support member relative to said driving means causing said gear to rotate in a direction which urges said linearly movable element in said preferred direction as said gear disengages from said spaced teeth on said linearly movable element;
 g. a pinion gear cluster rotatably mounted on said second end of said support member, said pinion gear adapted to mesh with said spaced teeth on said linearly movable element;
 h. a driving chain operatively connected said pinion gear cluster and said driving gear; and
 i. means connected to said support member for moving said second end of said support member relative to said driving gear for engaging and disengaging said pinion gear from said teeth on said linearly movable element.

7. A linear drive apparatus, comprising:
 a. a housing;
 b. a longitudinally extended linearly movable element disposed in said housing, said element having first and second gear racks disposed on its opposite sides;
 c. first and second gears adapted to engage said first and second racks respectively;
 d. means mounted on said housing for simultaneously driving said first and second gears in opposite directions;
 e. means operatively connected to said first and second gears for concurrently rotating and disengaging said gears from said first and second racks of said linearly movable element.

8. A linear drive apparatus comprising:
 a. a housing;
 b. a longitudinally extended linearly movable element disposed in said housing, said element having a first and second gear rack disposed on its opposite sides and said element being loaded to move in a preferred direction parallel to its longitudinal axis;
 c. first and second support members movably suspended from said housing;
 d. first and second gears rotatably mounted on said first and second support members respectively, said gears being adapted to engage said first and second racks respectively;
 e. means mounted on said housing for driving said first and second gears;
 f. means mounted on said housing and connected to said first and second support members for moving said support members relative to said driving means causing said first and second driving gears to rotate in respective directions which urge said linearly movable element in said preferred direction as said first and second gears disengage from said first and second racks.

9. The linear drive apparatus as recited in claim 8 wherein said means of element f of claim 14 for moving said support members relative to said driving means includes:
 a. an actuator mounted on said housing, the actuating stem of said actuator oriented to move parallel to said linearly movable element;

b. a yoke positioned around said linearly movable element, one end of which is pivotally connected to said actuating stem of said actuator and the other end of which is pivotally connected to and supported by said housing;

c. a collar slidably disposed around said linearly movable element and connected to said yoke, said collar having first and second oppositely disposed fastening lugs on either side of said collar adjacent to but laterally displaced from said first and second gear racks; and d. first and second toggle links pivotally connecting said first and second fastening lugs to said first and second support members.

10. A linear drive apparatus as recited in claim 9 wherein said first and second support members movably suspended from said housing each have first and second ends, said support members being rotatably mounted at said first ends and said toggle links pivotally connected to said second ends.

* * * * *

UNITED STATES PATENT OFFICE
CERTIFICATE OF CORRECTION

Patent No. 3,965,757                    Dated June 29, 1976

Inventor(s) Donald Martin Barrus

It is certified that error appears in the above-identified patent and that said Letters Patent are hereby corrected as shown below:

Column 8, line 63, "14" should read -- 8 --.

Signed and Sealed this

Seventeenth Day of May 1977

[SEAL]

Attest:

RUTH C. MASON
*Attesting Officer*

C. MARSHALL DANN
*Commissioner of Patents and Trademarks*